March 3, 1970 P. R. SCOTT 3,498,838
METHOD FOR FORMING AND CIRCULATING PLUGS IN A PIPELINE
Filed June 21, 1967 2 Sheets-Sheet 1

INVENTOR:
PAUL R. SCOTT
BY: *Louis J. Bovasso*
HIS ATTORNEY

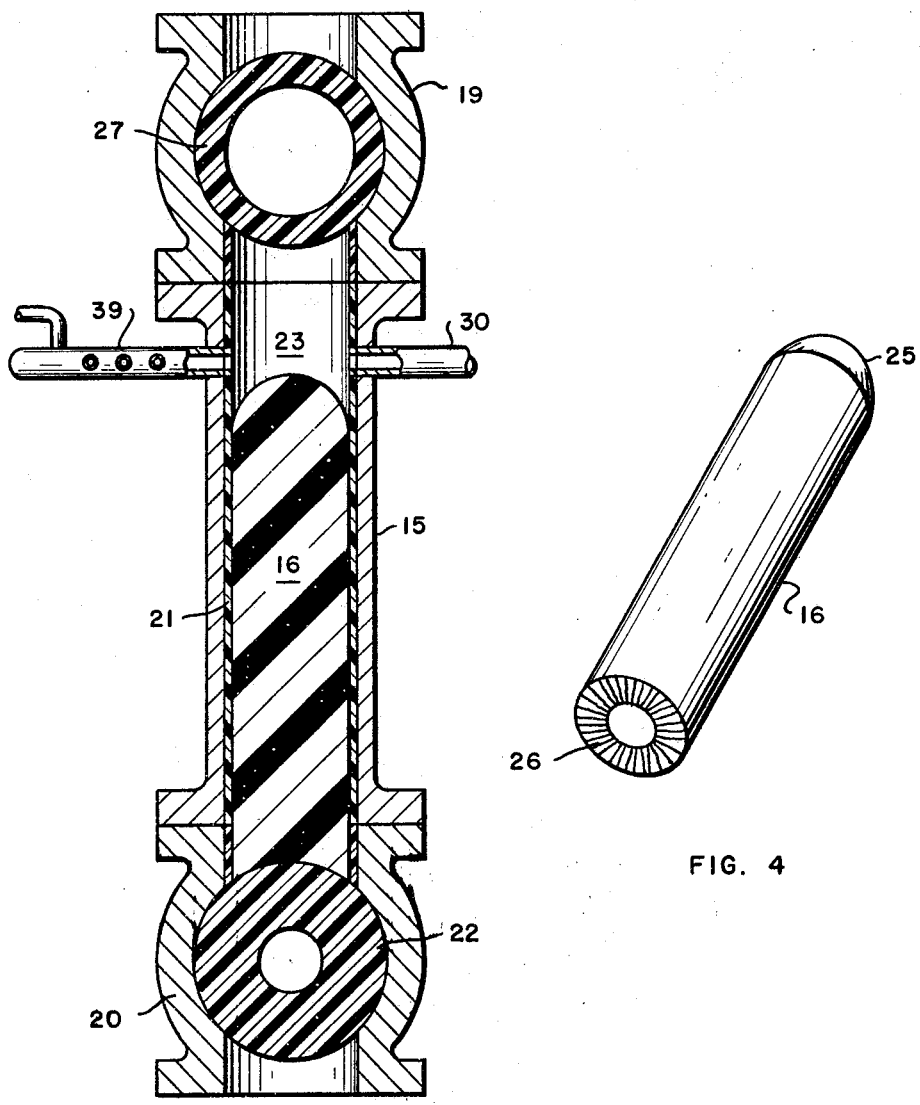

United States Patent Office 3,498,838
Patented Mar. 3, 1970

3,498,838
METHOD FOR FORMING AND CIRCULATING PLUGS IN A PIPELINE
Paul R. Scott, Houston, Tex., assignor to Shell Oil Company, New York, N.Y., a corporation of Delaware
Filed June 21, 1967, Ser. No. 647,819
Int. Cl. B08b 9/04
U.S. Cl. 134—8          5 Claims

ABSTRACT OF THE DISCLOSURE

An improved method for forming and circulating a plug within a pipeline comprising introducing reactable materials within a pipeline adapted to form a thermoplastic resin in situ within the pipeline.

BACKGROUND OF THE INVENTION

Field of the invention

This invention relates to an improved method for forming and circulating a plug within a pipeline; more particularly, it relates to an improved method for introducing reactable materials adapted to form in situ a plastic plug within the pipeline.

Description of the prior art

The method most commonly used for injecting plugs (i.e., scrapers, pipeline spheres, etc.) into a pipeline system consists of transporting the plug to the site by one or more methods of transportation, manually inserting the plug into an extension of the pipeline system and then manually diverting the stream to cause the plug to enter the pipeline system proper. The cost of transporting and handling these plugs is high.

Recently, it has been suggested to form in situ plugs from one of the liquids or mixtures flowing in a common pipeline system. These plugs, called gelled plugs, are used in interface control when different fluids are flowing one after another through the same pipeline. In the petroleum industry, for example, crude oil of high sulfur content may follow or precede a crude oil of low sulfur content, or gasoline may follow fuel oil in a products line. Intermixing of such flows is undesirable since the more valuable composition may become adulterated by intermixing with even minor quantities of the less valuable composition. One prior art procedure suggested for controlling the interfaces between the different fluids flowing in the same pipeline is to form in situ a fluid or liquid plug in the pipeline. This liquid plug is so formed by combining hydrocarbon and water gel to obtain a gel-like mass which then moves with the fluids in the pipeline under normal pumping pressure. This type of plug is described in Patent No. 3,209,771 to Gogarty et al. However, one disadvantage of this type of plug is that surface irregularities within the pipeline may distort the shape of the gelled plug and break it into pieces. There will then be an undesirable mixing between the different fluids albeit minor the breakage of the gelled plug.

Such plugs (or, more appropriately referred to as "pigs" in the pipeline art) serve an additional function in acting as a scraper for removing sediment and scale from the internal walls of the pipeline. The removal of scale from the walls of the pipeline is necessary in order to maintain the capacity of the line at a constant level. If scale is allowed to build up in the line, the capacity of the line is reduced.

The prior art plugs discussed above would not have the necessary rigidity to function as both a fluid interface controller and a pig scraper. In other words, gelled plugs would not eliminate the need for conventional plugs, scrapers, spheres, etc.

SUMMARY OF THE INVENTION

It is an object of this invention to provide a pipeline plug which can be readily and easily formed within a pipeline and function as either a pig scraper or provide interface control, or both.

The concepts of this invention are carried out by forming a foamed polyurethane plug in situ within a pipeline. This is preferably done by reacting polyhydric alcohol with tolylene diisocyanate in the presence of a suitable catalyst. The plugs thus formed would have sufficient durability and yield strength to travel long distances in pipelines and remain effective. These plugs could be used to remove water from liquid hydrocarbon pipelines and accumulated liquids from liquid-gas two-phase pipelines as is well known in the pipeline art.

Forming these plugs in situ results in greatly reduced costs since the chemicals which are used may be transported to the site in quantities sufficient to make many plugs. These chemicals are normally liquids or powders which are easily transferred to storage containers. Relatively inexpensive equipment consisting of readily available valves, pipes, pumps, timers and switches can be assembled to cause the chemicals to enter automatically the pipeline system or an extension thereof. This method is particularly attractive in two-phase gas-liquid, water-wet hydrocarbon and product pipelines. These plugs keep the liquid holdup to a desired level in two-phase pipelines, sweep water out of wet pipelines, separate tenders and reduce interfacial contamination in product pipelines.

BRIEF DESCRIPTION OF THE DRAWING

FIGURE 3 is a vertical sectional view of a portion of the equipment of FIGURE 1; and FIGURE 4 is an isometric view of a plug formed by the process of the invention.

DESCRIPTION OF THE PREFERRED EMBODIMENT

Figure 1:
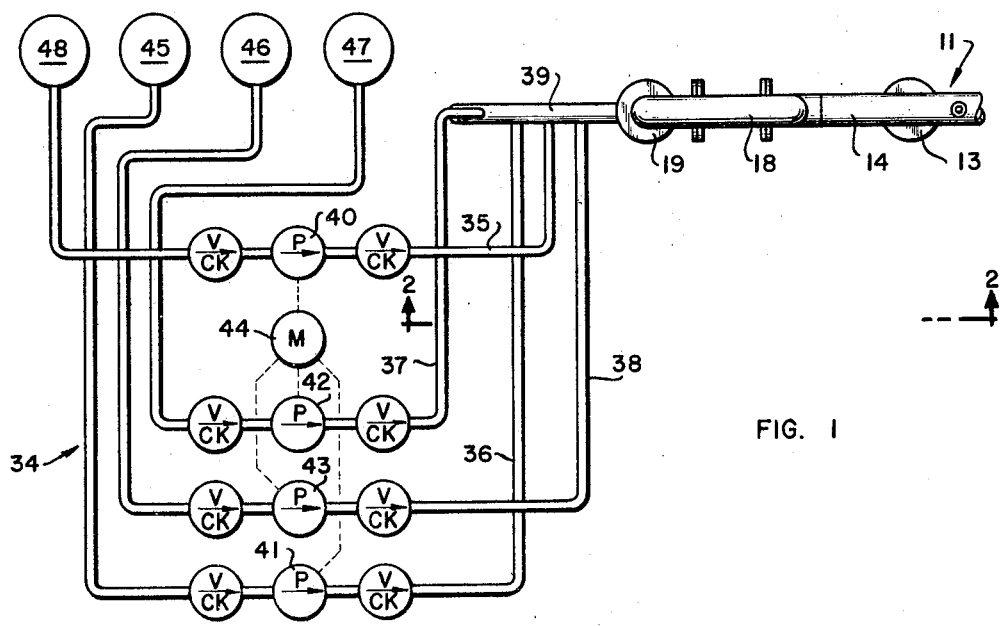
FIGURE 1 is a diagrammatic plan view of a preferred process for carrying out the concepts of the invention.
Figure 2:
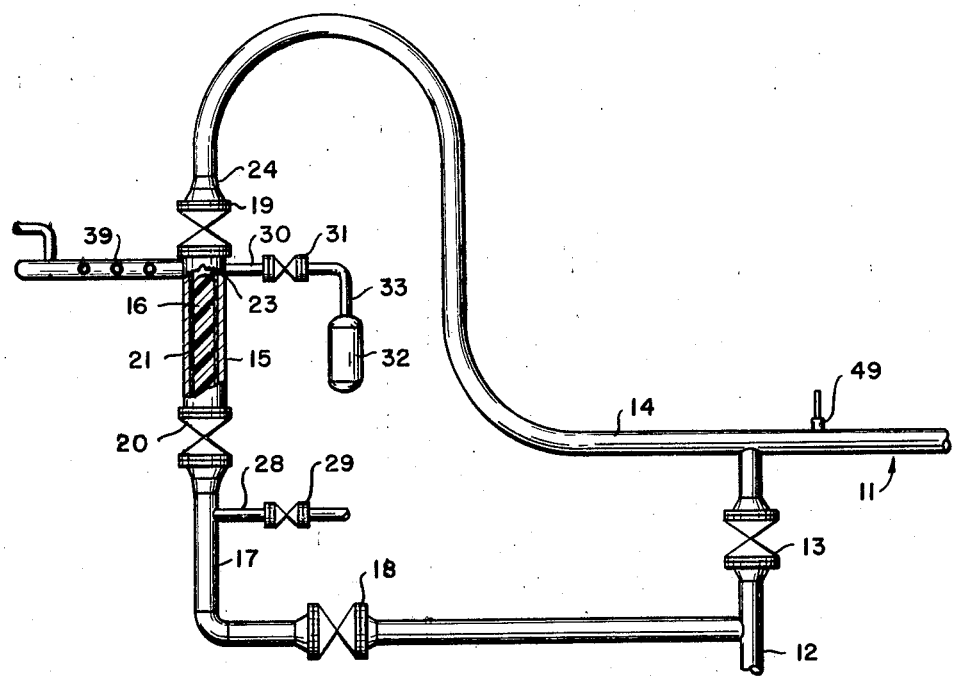
FIGURE 2 is a vertical sectional view taken along lines 2—2 of FIGURE 1.

Referring to FIGURE 1, a pipeline system 11 is illustrated having an inlet portion 12 (FIGURE 2) controlled by a suitable valve 13 for introducing fluids into the pipeline 14 of pipeline system 11. A station 15 (FIGURE 2) is arranged in communication with pipeline 14 for introducing a plug 16 into the system 11. Fluid from pipeline inlet portion 12, under pressure, enters station 15 through fluid inlet 17 which is in communication with both station 15 and inlet portion 12 and is controlled by a suitable fluid control valve 19 which permits plug 16 to enter pipeline 14. The opposite end of station 15 is preferably controlled by a ball valve 20 which has a Teflon or the like lining 21 to reduce the friction between the plug 16 and the ball 22 (FIGURE 3) of valve 20. Station 15 is oriented so void chamber 23 formed within station 15 is in a vertical direction and valve 20 is on the bottom of station 15.

The chamber 23 within station 15 is preferably slightly larger in cross-sectional area than the cross-sectional area of pipeline 14 so that the plug 16 is slightly compressed radially when it is introduced into pipeline 14 past the reduced neck portion 24 of station 12. Plug 16 is illustrated in FIGURE 4 as having a cylindrical configuration with a rounded front end 25 and with a concave back end 26, this being the shape generally formed within station 15. Lining 21 covers the internal wall of the area of station 15 occupied by plug 16 to reduce friction between plug 16 and the station 15 as will be described hereinbelow. Preferably, ball 22 and ball 27 of valve 19 are also formed of Teflon or similar material.

Station 15 is in communication with a fluid outlet 28 controlled by a suitable valve 29 and which communicates with fluid inlet 17. Station 15 is also in communication with a gas inlet 30 controlled by a suitable valve 31.

A gas storage chamber or vessel 32 operatively engages branch portion 33, in communication with valve 31, for providing the introduction of a suitable gas, such as methane or nitrogen, into gas inlet 30 and thus into chamber 23.

In operation, fluid from station 15 is conveyed from station 15 through fluid outlet 28 in communication with fluid inlet 19. The gas conveyed through gas inlet 33 flows into gas inlet 30 and thus into chamber 23 to fill the volume previously occupied by fluid with the injected gas.

A control system 34 (FIGURE 1) is in communication with station 15 occupied by plug 16. Control system 34 comprises a plurality of branch portions 35, 36, 37 and 38 and mixer 39. Branch portions 35, 36, 37 and 38 intersect with mixer 39, the mixer 39 cooperating with the chamber 23 of station 15 adapted to be occupied by plug 16. A plurality of pumps 40, 41, 42 and 43 cooperate with branch portions 35, 36, 37 and 38, respectively, for controlling the introduction of materials into chamber 23. Pumps 40, 41, 42 and 43 are preferably controlled by a suitable motor 44.

A storage chamber or vessel 45 operatively engages branch portion 36 for providing the introduction of a suitable reactant substance, such as polyhydric alcohol, into branch portion 36 and into mixer 39, and thus into chamber 23. A storage chamber or vessel 46 is in operative communication with branch portion 38 so as to provide for the introduction of a suitable substance adapted to react with the polyhydric alcohol, such as tolylene diisocyanate, and allow it to be conveyed into mixer 39 and thus into chamber 23. A storage chamber or vessel 47 is in operative communication with branch portions 37 for introducing a suitable catalyst, such as an amine catalyst, into mixer 39 and thus into chamber 23. Obviously, these ingredients are preferably simultaneously introduced into mixer 39 to result in a blending of all these chemicals, the blending being conveyed into chamber 23.

A chamber or storage vessel 48 is operative communication with branch portion 35 for providing the introduction of a suitable solvent, such as benzene, into mixer 39, for the purpose of diluting and removing the reactive substances, as the polyhydric alcohol and tolylene diisocyanate from the mixer 39.

Obviously, a wide variety of reactable materials could be introduced through vessels 45, 46 and 47; however, the specific materials disclosed here have been selected to form in situ a foamed polyurethane plug 16 in chamber 15. Any combination of materials can be used to form any thermoplastic resin desired. For example, the teachings of Patent No. 3,238,273 to Hampson et al. could be utilized to form in situ a polyurethan plug as suggested by this application. Polyesters and polyepoxides can be used with with varying degrees of success; however, polyurethane is preferred because of its facility in use. Also, polyurethane foams can be formed at normal pipeline temperatures. The foaming of the polyurethane can result from the initial reaction or be accomplished by the introduction of a volatile material such as Freons. The resin can be a natural material, such as rubber, or a so-called synthetic material such as a foamed polyester. Any suitable catalyst can be introduced from vessel 47, such as triethylamine. The previously discussed patent to Hampson et al. discusses various possibilities such as additives for providing color identification, etc., which can be readily applied to the plug 16. A patent to Carey et al., Patent No. 3,282,-863, also discloses various materials which can be utilized to form in situ a resin foam in the chamber 23 of the pipeline system 11 of the instant invention. For example, a liquid epoxy resin containing a plurality of terminal epoxy rings, a volatile chlorofluorocarbon that boils at not substantially above room temperature, an emulsifying agent, and a coordination compound of boron trifluoride, the mixture being at a temperature below the boiling point of the chlorofluorocarbon, can be introduced into chamber 23 through vessels 45, 46 and 47 to form in situ a foamed resin body.

In operation, the plug 16 thus formed in chamber 23 can be launched through a predetermined schedule by opening valve 19, valve 20 and then valve 18 in that order. Valve 13 is then closed and fluid is introduced under pressure through fluid inlet 17 and plug 16 is forced (and thus compressed radially) through reduced neck portion 24 and into pipeline 14. The plug thus formed in situ by the method disclosed previously can function as either a fluid interface controller, a pig scraper, or both.

Valve 13 opens after plug 16 is launched and has moved past inlet portion 12 having been detected by a conventional plug detector 49 in communication with pipeline 14. Valve 19 closes and valve 18 closes. Valve 29 and then valve 31 open and the fluid in the chamber 23 is forced out through fluid outlet 28 by gas introduced into chamber 23 through gas inlet 30. Valve 31, valve 29 and then valve 20 close leaving chamber 23 filled with a gas under a desirable pressure. Chamber 23 is now ready to receive the reactive materials to form a new plug. Obviously, if the fluid transported by the pipeline system 11 is either a gas or a liquid with a high vapor pressure, there may be no need for the introduction of a gas into chamber 23 to displace the fluid. Also, a pump, if desired, may be attached to fluid outlet 28 for the purpose of returning the fluid to the pipeline system 11 or transfer to a storage vessel.

I claim:
1. A method for forming and circulating a pipeline plug within a pipeline, the pipeline including a chamber in selective fluid communication therewith, said method comprising the steps of:
  injecting materials into said chamber which are adapted to react therein and form a plug composed of a resilient cellular polyurethane material in situ within the pipeline;
  maintaining said materials in the chamber for a period of time sufficient to allow said materials to react and form a unitary circulatable plug within the chamber;
  discharging said plug from said chamber into the pipeline; and
  circulating said plug within said pipeline.
2. The method of claim 1 wherein the step of introducing reactable materials which form a cellular polymeric material includes reacting polyhydric alcohol with tolylene diisocyanate in the presence of an amine catalyst, thereby forming foamed polyurethane.
3. The method of claim 1 wherein the step of introducing reactable materials which form a cellular polymeric material includes introducing reactable materials which form foamed polyurethane.
4. The method of claim 1 wherein the step of discharging said plug is carried out by putting the chamber in communication with the pipeline and applying pressure in back of the plug to force it out of the chamber and into the pipeline.
5. The method of claim 4 wherein the step of forcing the plug into the pipeline includes the additional step of compressing the plug radially at the time it is discharged into the pipeline.

References Cited

UNITED STATES PATENTS

| | | | |
|---|---|---|---|
| 2,906,650 | 9/1959 | Wheaton | 15—104.06 X |
| 3,133,978 | 5/1964 | Bartley | 264—45 |
| 3,209,771 | 10/1965 | Gogarty | 137—1 |
| 3,216,435 | 11/1965 | Poettmann | 137—802 X |
| 3,238,273 | 3/1966 | Hampson | 260—835 X |
| 3,266,076 | 8/1966 | Sarber | 137—268 X |
| 3,277,508 | 10/1966 | Knapp | 15—104.06 |
| 3,340,336 | 9/1967 | Bender | 264—45 |
| 3,403,701 | 10/1968 | Knapp et al. | 137—268 X |

DONALD J. ARNOLD, Primary Examiner

P. A. LEIPOLD, Assistant Examiner

U.S. Cl. X.R.

137—1, 15; 264—45